United States Patent
Sumler et al.

(10) Patent No.: US 7,206,548 B1
(45) Date of Patent: Apr. 17, 2007

(54) METHOD AND SYSTEM FOR NETWORK-BASED REMOTE CONTROL AND TESTING OF WIRELESS COMMUNICATION DEVICES

(75) Inventors: John D. Sumler, Kansas City, MO (US); Ben E. Bellinder, Lenexa, KS (US); Nick J. Baustert, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 308 days.

(21) Appl. No.: 10/977,142

(22) Filed: Oct. 29, 2004

(51) Int. Cl.
*H04B 17/00* (2006.01)

(52) U.S. Cl. .................. 455/67.11; 455/423; 455/420; 455/67.14; 455/566

(58) Field of Classification Search ............. 455/416, 455/423, 67.11, 67.7, 424, 425, 418, 419, 455/420, 566, 67.74; 379/1.01, 27.01, 29.01, 379/29.1
See application file for complete search history.

(56) References Cited

U.S. PATENT DOCUMENTS

| | | | |
|---|---|---|---|
| 6,094,213 A * | 7/2000 | Mun et al. ............... | 348/14.05 |
| 6,429,855 B2 * | 8/2002 | Pabon et al. ............. | 345/172 |
| 7,126,626 B2 * | 10/2006 | Sawahara et al. ......... | 348/14.02 |
| 2003/0058275 A1 * | 3/2003 | Piu et al. ................ | 345/751 |
| 2004/0098456 A1 * | 5/2004 | Kryzanowski et al. ...... | 709/204 |
| 2004/0199303 A1 * | 10/2004 | Ohmura et al. ........... | 701/5 |
| 2005/0062850 A1 * | 3/2005 | Lin ...................... | 348/207.1 |
| 2005/0212927 A1 * | 9/2005 | Hamamura et al. ....... | 348/222.1 |
| 2006/0033809 A1 * | 2/2006 | Farley .................... | 348/14.01 |

OTHER PUBLICATIONS

Spirent Communications, "Universal Tool Suite (UTS) New! UTS," (2001).
TestQuest, "Interface for UTS Phones," (2004).
Symantec, Inc., "pcAnywhere™," printed from the World Wide Web, http://www.symantec.com/pcanywhere/consumer, (Oct. 1, 2004).
IBM, "Experience remote usability testing, Part 1," printed from the World Wide Web, http:/www-106.ibm.com/developerworks/web/library/wa-rmusts1/, (Jul. 29, 2004).

* cited by examiner

*Primary Examiner*—George Eng
*Assistant Examiner*—Huy Phan

(57) ABSTRACT

A method and system for remote testing of a wireless communication device (WCD). The WCD is communicatively linked in a test environment with a host computer that communicates over a packet-switched network with a remote computer operated by a testing technician. The remote computer sends control commands to the host computer via the packet-switched network, and the host computer sends corresponding commands to the WCD to cause the WCD to take one or more actions. In a preferred embodiment, the WCD returns to the host computer a digital representation of the screen image currently being shown on a display screen of the WCD, and the host computer passes the digital representation via the packet-switched network to the remote computer for presentation to the technician. The technician can thereby view the display screen of the WCD as tests are performed. Audio and test-equipment coupling may also be provided.

22 Claims, 7 Drawing Sheets

METHOD AND SYSTEM FOR NETWORK-BASED REMOTE CONTROL AND TESTING OF WIRELESS COMMUNICATION DEVICES

FIELD OF THE INVENTION

The present invention relates to wireless communications and, more particularly, to testing of wireless communication devices such as cellular telephones for instance.

BACKGROUND

It is generally known today to test wireless communication devices, such as cellular telephones, before releasing them to the market. In typical practice, testing of such a device would involve testing how the device interoperates with various network systems (such as various types of base stations, switches, etc.) and testing how the device interoperates with users, and testing how the device operates in various types of environments (such as in various RF conditions, climates, lighting conditions, sound conditions, etc.) To facilitate robust and efficient testing of such a device, it is therefore quite useful to have a well-equipped laboratory that can emulate or provide actual interaction with various types of network equipment and users in various types of environments. Unfortunately, however, manufacturers and vendors of such devices do not all have convenient access to such robust testing facilities.

SUMMARY

The present invention provides a method and system for remote testing of a cellular wireless communication device (WCD).

In accordance with the invention, a WCD in a test environment will be locally coupled with a computer that will then communicate over a wide area packet-switched network with another computer at which a testing technician will be situated. The WCD will have a particular state of operation, and the remote computer (instructed by the technician for instance) will supply control signals, via the network and local computer, to affect the state of the WCD. Further, the local computer will receive from the local connection with the WCD a real-time representation of the screen image that is being displayed on the WCD, and the local computer will deliver that screen image in substantially real-time over the network to the remote computer. As the remote computer receives that screen image, the remote computer will then display the screen image in substantially real-time for viewing by the technician.

With this arrangement, the technician at the remote computer can conveniently direct the WCD to carry out various functions in the test environment and can see, in substantially real-time, the screen image that is being displayed on the WCD. The technician can thereby see how the screen image of the WCD changes as the WCD performs the functions that the technician directs it to perform, all via the wide area network connection.

By way of example, by directing the remote computer to send dialing instructions to the local computer for input to the WCD, the technician can direct the WCD to initiate a phone call to a particular number. As the WCD dials out the phone number and the dialed digits appear on the screen display of the WCD followed by other status information such as "Connecting . . . " and "Connected" indicators, the technician would see those changing screen displays in substantially real-time on the remote computer. The technician could similarly direct the WCD to take other incremental actions that would result in changes in the WCD screen display and could see the resulting changed screen display in the same manner.

By the same token, the invention could extend to transmission of sound information from the WCD, through the local computer and over the wide area network, to the remote computer, for presentation of the sound in substantially real-time to the technician, and transmission of sound from the technician as well to the WCD. Thus, for instance, if the technician dials a call out on the WCD as described above, the technician could then hear a ringing or busy signal and, if a called party answers, could confer with the called party.

Further, in a preferred embodiment, the local computer can feed other diagnostic data to the remote computer for viewing by the technician, and the technician can provide other test instruction data, via the remote computer, to the local computer, to control the test environment. For example, the WCD could collect and provide the local computer with various RF metrics other information related to its wireless communication (such as receive signal strength measurements, transmit signal strength measurements, signaling messages sent to and received from base stations, data packet header information, frame error rate information, etc.), and the local computer could send that data over the network and to the remote computer for viewing in substantially real-time by the technician. Similarly, the WCD could collect and provide the local computer with various other diagnostic monitoring metrics, such as application states, and PPP and IP packets communicated to and from the WCD, and the local computer could send that data over the network to the remote computer for viewing in substantially real-time by the technician.

Additionally, the technician could direct the remote computer to send other sorts of control signals via the network to the local computer, to control one or more aspects of the testing environment. For instance, if the WCD is being subjected to a radiation test, the technician could cause the radiation level to be increased or decreased. Or if the WCD is being subjected to a humidity test, the technician could cause level of humidity to be increased or decreased. Other examples are possible as well.

With the benefit of this arrangement, it becomes possible for the technician to remotely control the WCD test environment and to receive useful feedback from the WCD in substantially real-time. Further, given that the local computer and remote computer will communicate with each other over a wide area network, the invention can even enable inter-continental remote WCD testing. For instance, a technician can sit at the remote computer in Korea to test a WCD that is situated in a test lab in the United States. Advantageously, the technician can thus carry out useful WCD tests without the need for the technician to be physically present in a robust test environment.

DETAILED DESCRIPTION OF AN EXEMPLARY EMBODIMENT

1. Example System Architecture

Figure 1:
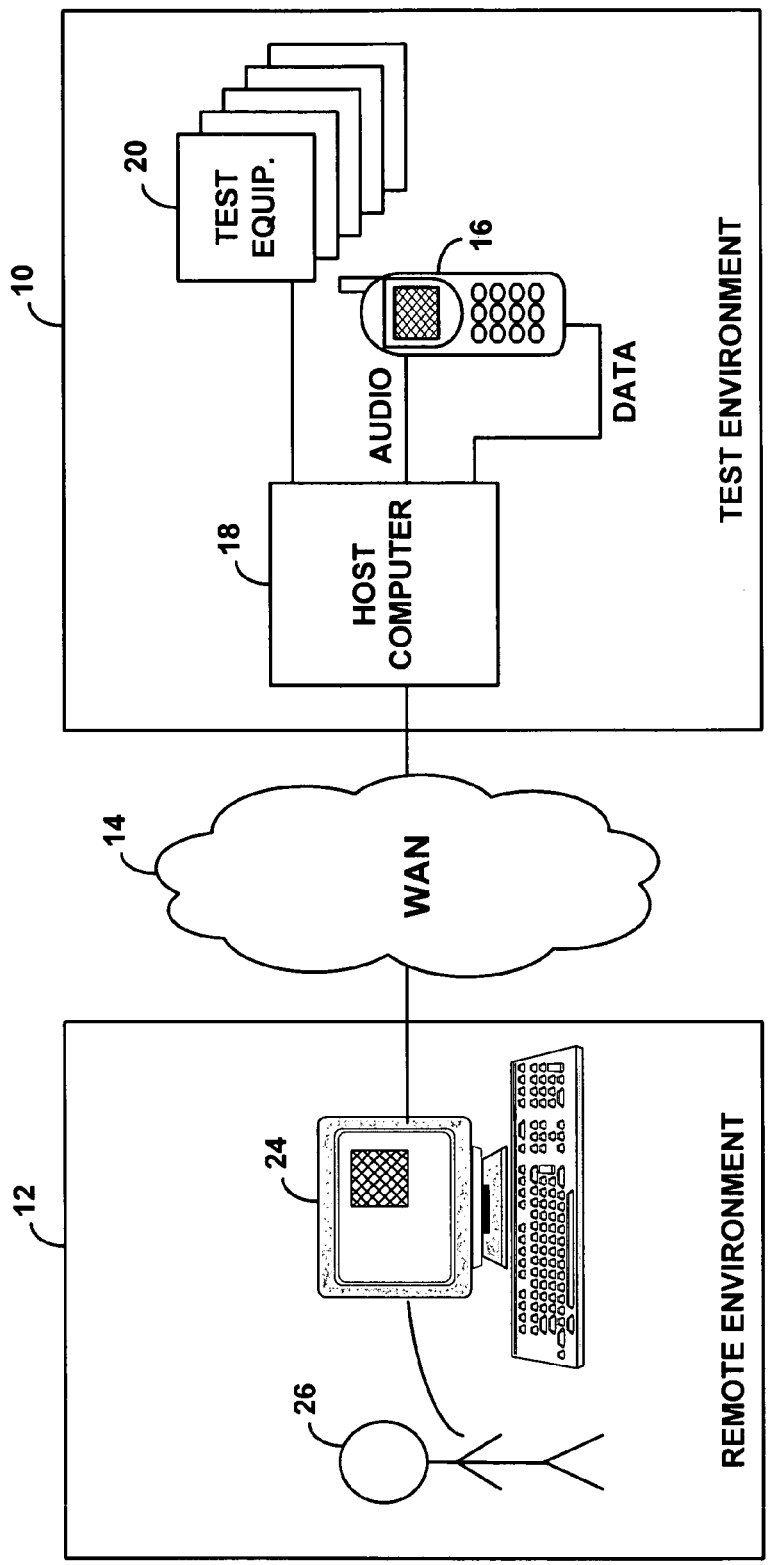
FIG. 1 is a block diagram depicting a system arranged to carry out an exemplary embodiment of the invention.

Referring to the drawings, FIG. 1 depicts a system arranged to carry out an exemplary embodiment of the invention. It should be understood, however, that this and other arrangements and processes shown and described herein are provided as examples only, and that many variations are possible. For instance, elements can be combined, distributed, omitted, added, or re-ordered. Further, the various logic functions described herein can be carried out by any combination of hardware, firmware and/or software, such as by one or more suitably programmed processors (e.g., one or more processors, data storage, and program instructions stored in the data storage and executable by the processor(s)), for instance.

The system of FIG. 1 includes a test environment 10, a remote environment 12, and a wide area network (WAN) 14 that provides a communication path between the test environment 10 and the remote environment 12. The test environment 10 contains a WCD 16, a host computer 18, and one or more pieces of test equipment 20. The WCD 16 is communicatively coupled with the host computer 18 by one or more links 22, which may include landline and/or wireless components. Further, the WCD 16 may be communicatively linked with the test equipment 20, although no such link is shown in the figure. The remote environment 12, in turn, includes a remote computer 24 that may be operated by a user 26. With this arrangement, remote computer 24 and host computer 18 can communicate with each other via WAN 24, and host computer can thereby affect and monitor operation of WCD 18.

Test environment 10 is preferably a robust test environment arranged to facilitate testing of WCDs such as WCD 16. As such, the test equipment 20 in environment 10 may include equipment for testing how the WCD interoperates with various network systems, as well as equipment for testing how the WCD interacts with users and how the WCD responds to various stimuli.

To facilitate testing of interoperation with network systems, the test equipment 20 would ideally (but not necessarily) include actual radio access network (RAN) equipment, such as one or more base transceiver stations (BTSs), base station controllers (BSCs), mobile switching centers (MSCs) or the like, preferably by various equipment vendors, and that actual RAN equipment may provide connectivity with actual signaling and transport networks.

To facilitate testing of how the WCD interacts with users and responds to various stimuli, the test equipment 20 may include any of a variety of equipment for imposing designated levels of RF radiation, vibration, temperature, sound, light, physical impact, and the like, on WCD 16 and equipment for sensing, measuring, and recording how WCD 14 responds to such stimuli. In this regard, or in addition, test equipment 20 may include equipment for sensing, measuring, and recording other behavior of WCD 16, such a sensors for detecting vibration, heat, sound, and the like.

WCD 16 is any type of wireless communication device but is preferably a wireless handset such as cell phone or wirelessly-equipped personal digital assistant (PDA). In a preferred embodiment, WCD 16 is equipped to place and receive circuit-switched telephone calls and to engage in packet-data communication. However, WCD 16 can take various forms and can be equipped to engage in various functions.

Host computer 18 is generally any sort of programmable computer (or computers), such as a WINDOWS-based personal desktop computer or notebook computer for instance. As such, computer 18 preferably has various input/output ports coupled with a programmable central processing unit or the like. The input/output ports provide for connection with WCD 16, WAN 14, and test equipment 20. Although not shown, host computer 18 would likely include user-interface components, such as a display screen and a keyboard.

WAN 14 is a packet-switched network (or combination of networks) that preferably spans a long distance, such as inter-state or inter-national, possibly even inter-continental, including landline and/or wireless components, whether or not including telephone lines or other like. WAN 14 may, for instance, be the world-wide Internet. Host computer 16 and remote computer 24 may then be positioned a substantial distance from each other and yet be in communication with each other via WAN 14. On the other hand, it is possible that WAN 14 may be smaller, and it is also possible that host computer 18 and remote computer 24 may be located more closely together, albeit still in communication with each other via the WAN.

Remote computer 24, like host computer 18, is generally any sort of programmable computer (or computers), such as a WINDOWS-based personal desktop computer or notebook computer for instance. As such, remote computer 24 also preferably includes a various input/output ports coupled with a programmable central processing unit or the like. At least one such input/output port provides connectivity with WAN 14. Further, remote computer 24 preferably includes a display screen 28 and keyboard 30, through which user 26 can interface with the computer 24.

Figure 2:
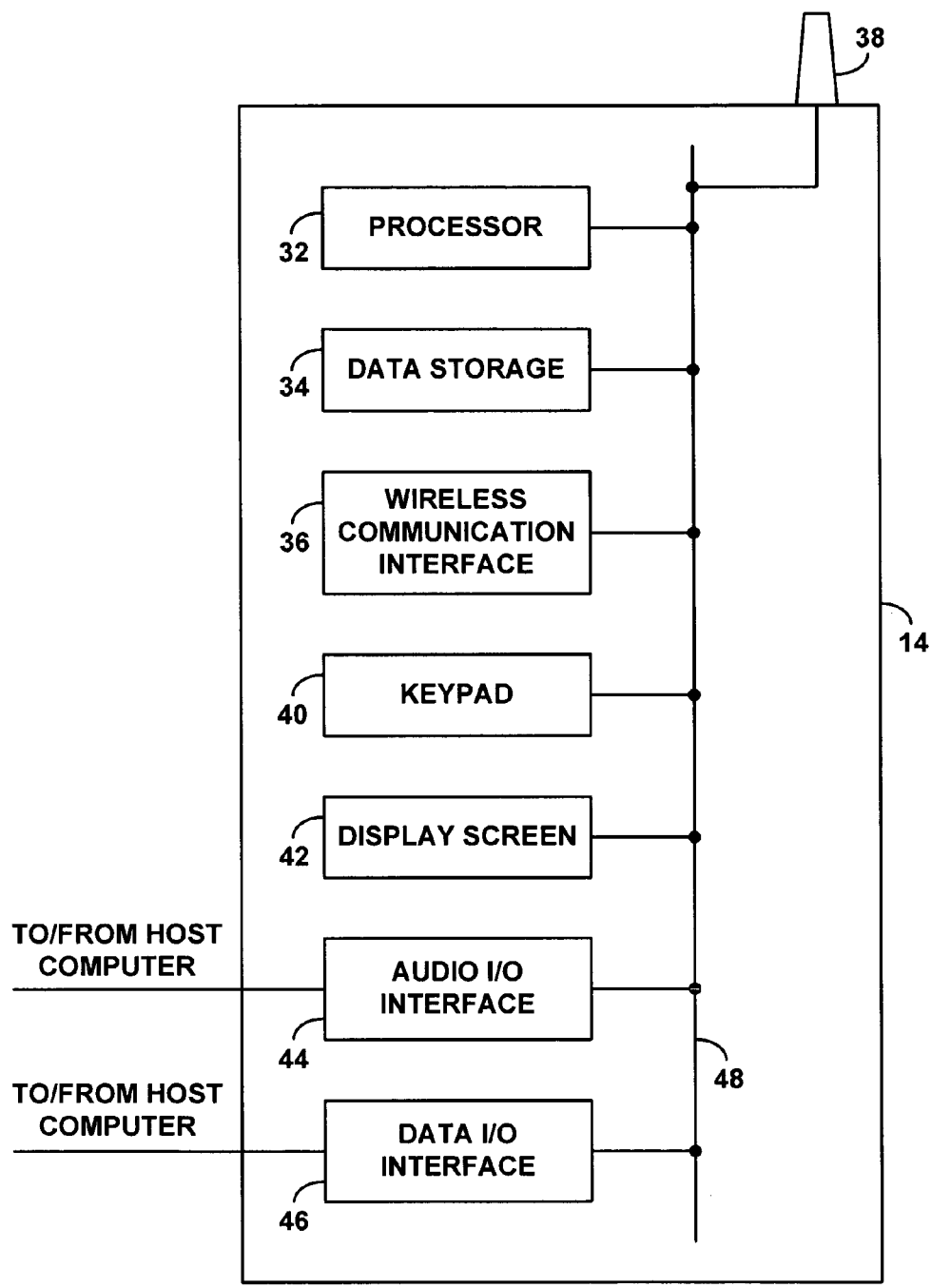
FIG. 2 is a block diagram depicting functional components of the WCD shown in FIG. 1.

FIG. 2 a more detailed block diagram, depicting functional components of WCD 16 in accordance with the exemplary embodiment. As shown in FIG. 2, WCD 16 includes a processor 32, data storage 34, a wireless communication interface 36 with antenna 38, a keypad 40, a display screen 42, an audio I/O interface 44, and a data I/O interface 46, which may be coupled together by a system bus or other mechanism 48.

Processor 32 includes one or more processing units, such as general microprocessors and/or dedicated processors. Data storage 34 include one or more storage components, such as volatile and/or nonvolatile memory or disk storage, which may be integrated in whole or in part with processor 32. Data storage 34 preferably contains machine language instructions that are executable by processor 32 to carry out various functions described herein, such as to take various actions produce various output signals in response to control commands received via data I/O interface 46 for instance.

Wireless communication interface 36 preferably facilitates wireless communication via antenna 38 and an air interface (not shown) with a radio access network (not shown) and may thus take various forms, an example of which is a Qualcomm MSM™ series chipset. Keypad 40 is, in turn, an alphanumeric keypad through which a user can enter alphabetic characters, numerals, and other characters and function commands to the WCD 16, such as a command for WCD 16 to dial a telephone number and/or otherwise initiate a communication via wireless communication interface 36.

Display screen 42 is preferably an LCD display screen or the like, arranged to display text and graphics pursuant to instructions from processor 32. For instance, display screen 42 may display a telephone number as it is being dialed by a user through keypad 40, display screen 42 may display a signal strength meter indicating received signal strength via wireless communication interface 36, and display screen 42 may display phone book entries, web pages, and/or assorted other information for viewing by a user. Keypad 40 could be integrated with display screen 42, as a touch-sensitive keypad, for instance.

Audio I/O interface 44 provides for transmission of audio signals into and out of WCD 16 via a connected cable or other means. As such, audio I/O interface 44 may comprise a chipset with sound I/O logic, and a port for receiving a cable connection. Audio I/O interface 44 may be designed, for instance, to connect with a conventional headset through which a user can hear sounds emitted by the WCD and can speak into the WCD. WCD 16 may also include an integrated microphone and integrated loudspeaker.

Data I/O interface 46 provides for transmission of data into and out of WCD 16 via a connected cable or other means. In a typical arrangement, data I/O interface 46 will be a pin-out port, typically having a proprietary arrangement depending on the make and model of the WCD. (Alternatively, the pin-out port may be a standard port, such as a USB or IEEE 1394 port, for instance.) The pin-out port is arranged to connect with a corresponding cable and provides various pins for data input and output. In some arrangements, the pin-out port may provide for audio transmission as well, instead of or in addition to audio I/O interface 44.

Preferably, processor 32 and data I/O interface 46 facilitate providing a digital representation of the screen image currently being presented on display screen 42. That is, when instructed, processor 32 may pass to one or more pins of data I/O interface 46 a set of data that defines the image that processor 32 is currently sending to be displayed on screen 42. For instance, if display screen 42 is showing a particular arrangement of alphanumeric characters and/or graphics, processor 32 may send a binary representation of that arrangement to data I/O interface 46 for output. A computer or other entity connected to the data I/O interface can then receive that binary representation and then further transmit the representation and/or render and present the screen image to a user.

Although not shown, WCD 16 may also have other I/O ports (as well as other components). For instance, WCD 16 may include an RF connection port that provides a direct connection into the wireless communication interface 36. Test equipment designed to emit RF signals for reception by the WCD 16 may then be coupled to the RF connection port, so as to facilitate controlled application of RF load on the WCD. Other examples are possible as well.

Figure 3:
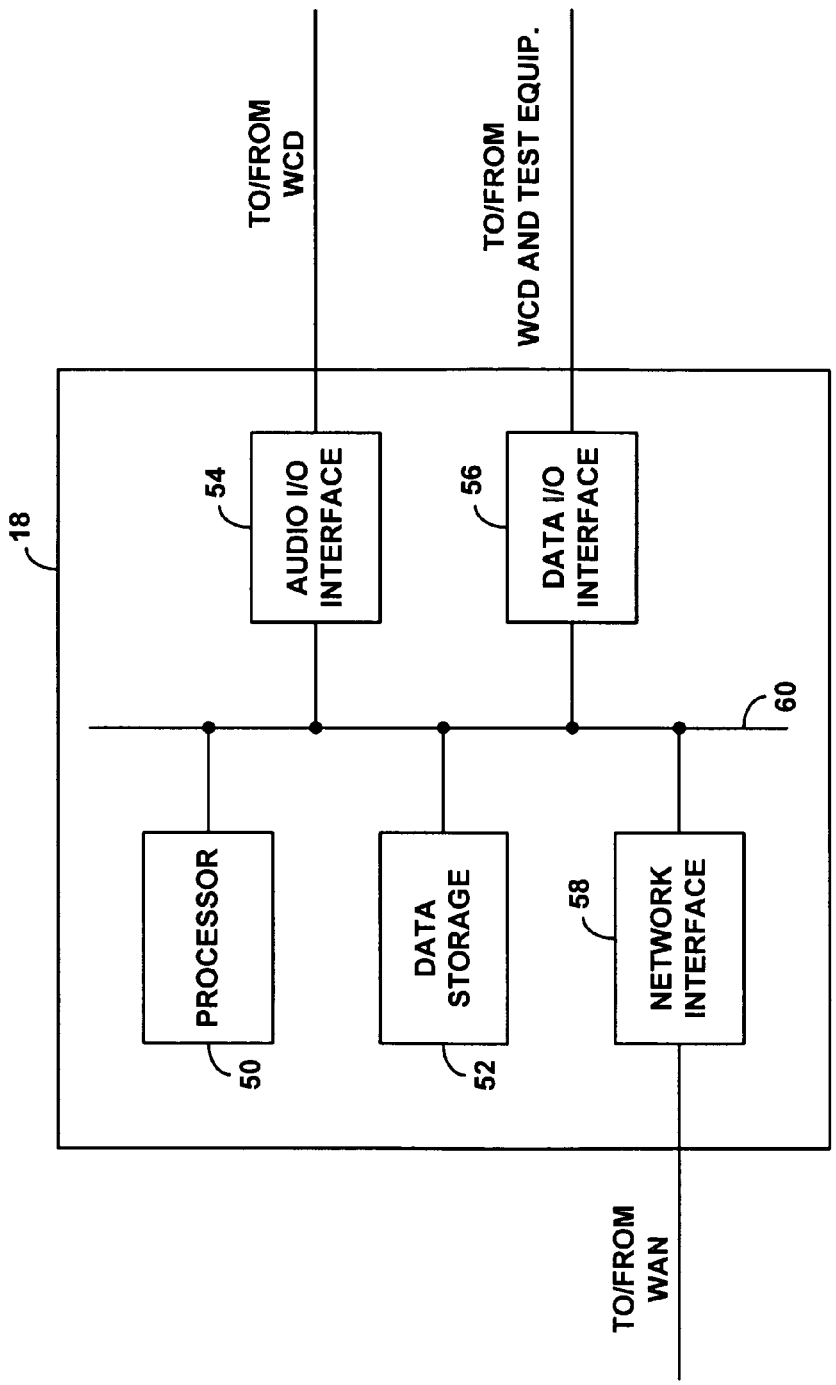
FIG. 3 is a block diagram depicting functional components of the host computer shown in FIG. 1.

FIG. 3 is next a block diagram depicting functional components of host computer 18 in accordance with the exemplary embodiment. As shown in FIG. 3, host computer 18 includes a processor 50, data storage 52, an audio I/O interface 54, a data I/O interface 56, and network interface 58, which may be coupled together via a system bus or other mechanism 60. In addition, host computer 18 may include user interface components (not shown), such as a display screen, keyboard, mouse, and loudspeakers.

Processor 50 includes one or more processing units, such as general microprocessors and/or dedicated processors. Data storage 52, in turn, includes one or more storage components, such as volatile and/or nonvolatile memory or disk storage, which may be integrated in whole or in part with processor 50. Further, data storage 52 preferably contains machine language instructions that are executable by processor 50 to carry out various functions described herein. For instance, the machine language instructions preferably define program logic arranged to interface between (i) communications with remote computer 24 via WAN 14 and (ii) communications with WCD 16 and/or test equipment 20.

Audio I/O interface 54 provides for transmission of audio signals into and out of host computer 18. As such, audio I/O interface 54 may comprise a sound card that provides line-in and line-out audio ports, for instance, and that is communicatively coupled with processor 50. In the preferred arrangement, audio I/O interface 54 is connected by one or more cables with the audio I/O interface 44 of WCD 16, so as to facilitate transfer of audio signals between host computer 18 and WCD 16.

Data I/O interface 56 provides for data communication between host computer 18 and one or more peripherals or other externally connected devices or systems. As such, data I/O interface 56 may include one or more data ports, such as a USB port, an RS-232 port, an IEEE 1394 port, or the like, with associated circuitry to communicate with processor 50. Data I/O interface 56 is preferably coupled by one or more cables with data I/O interface 46 of WCD 16, so as to facilitate transfer of data between host computer 18 and WCD 16 (e.g., to send control commands to WCD 16, and to receive screen images and other data from WCD 16). Further, data I/O interface 56 is also preferably coupled with one or more components of test equipment 20, so as to facilitate transfer of data between host computer 18 and test equipment 20 (e.g., to send control commands to the test equipment 20 and to receive test results from the test equipment 20).

Network interface 58 provides for connection with WAN 14 and data communication on WAN 14. Preferably, network interface 58 is an Ethernet network interface card that includes circuitry and an RJ-45 port through which host computer 18 can be coupled to a router, hub, or switch of WAN 14. Data storage 52 preferably includes program logic executable by processor 50 to support packet-data communications over the WAN. For instance, the program logic may define network and transport protocols such as the Internet Protocol (IP) and Transmission Control Protocol (TCP) in a manner well known in the art.

Figure 4:
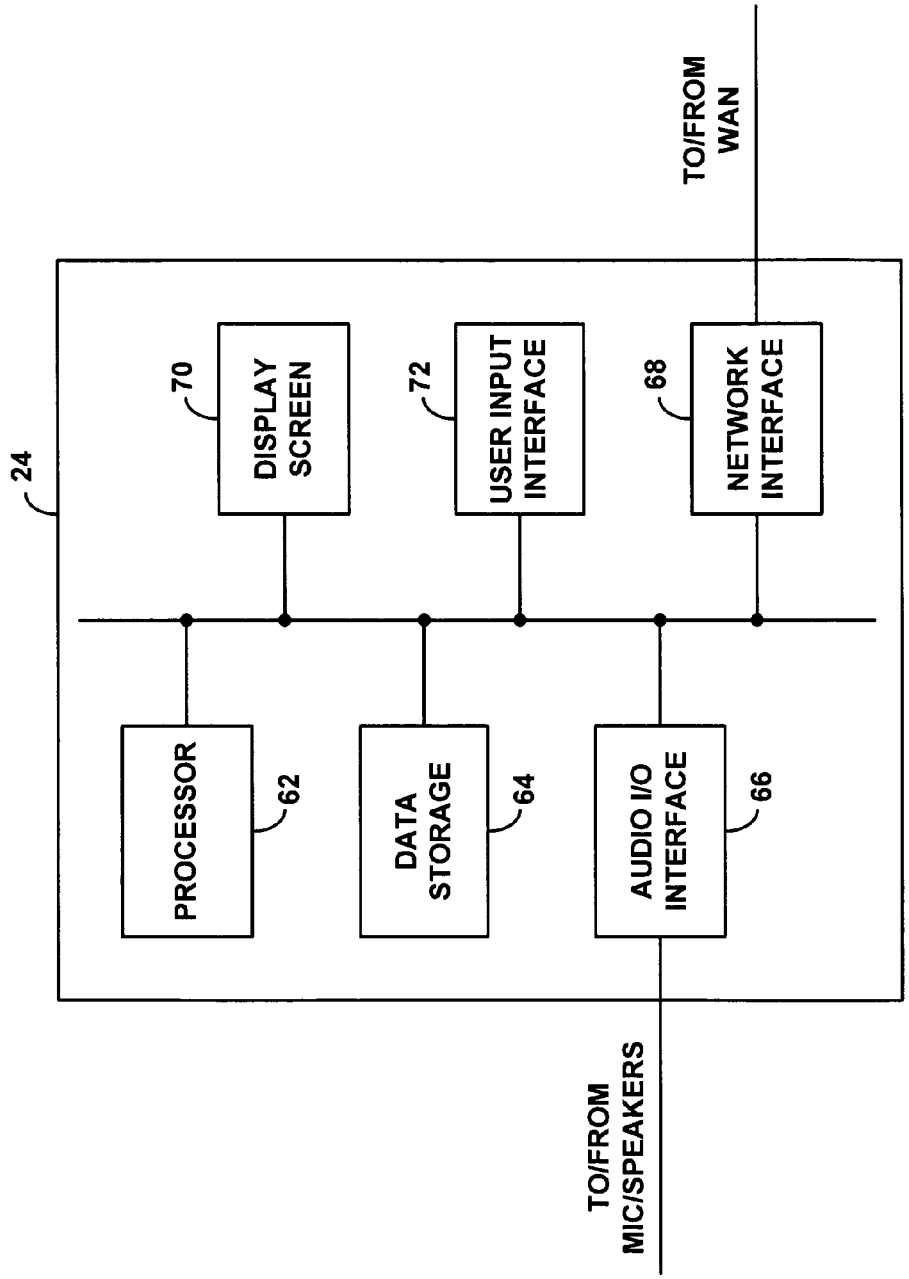
FIG. 4 is a block diagram depicting functional components of the remote computer shown in FIG. 1.

FIG. 4 is next a block diagram depicting functional components of a remote computer 24 in accordance with the exemplary embodiment. As shown in FIG. 4, remote computer 24 includes a processor 62, data storage 64, an audio I/O interface 66, a network interface 68, a display screen 70, and user-input mechanism 72, also coupled together by a system bus or other mechanism 74. (Although the functional blocks of host computer 16 and remote computer 24 differ in the figures, the computers could just as well be identically configured.)

Processor 62 includes one or more processing units, such as general microprocessors and/or dedicated processors, and data storage 64 includes one or more storage components, such as volatile and/or nonvolatile memory or disk storage, which may be integrated in whole or in part with processor 62. Data storage 64 further contains machine language instructions executable by processor 62 to carry out various functions described herein. For instance, the machine language instructions preferably define program logic arranged to interface between (i) communications with user 26 and (ii) communications with host computer 18 via WAN 24.

Audio I/O interface 66 provides for transmission of audio signals into and out of remote computer 18. As such, audio I/O interface 66 may include a sound card that provides line-in and line-out audio ports and that is communicatively coupled with processor 62. The line-in and line-out audio ports are preferably linked by one or more cables with a headset and/or a separate microphone and separate loudspeaker (not shown), to enable user 26 to receive audio from remote computer 24 and to provide audio into remote computer 26.

Network interface 68 provides for connection with WAN 14 and data communication on WAN 14. Preferably, network interface 68 is an Ethernet network interface card that includes circuitry and an RJ-45 port through which remote computer 24 can be coupled to a router, hub, or switch of WAN 14. Data storage 64 preferably includes program logic executable by processor 62 to support packet-data communications over the WAN. For instance, the program logic may define network and transport protocols such as the Internet Protocol (IP) and Transmission Control Protocol (TCP) in a manner well known in the art.

Through network interface 68, remote computer 24 can send control commands, data, and audio to host computer 18 via WAN 14 and can receive data and audio from host computer 18 via WAN 14. For instance, remote computer 18 can send a control command via WAN 14 to host computer 18, to cause host computer 18 to instruct WCD 16 to dial a particular number or to take some other action such as to provide a digital representation of a screen image that is currently being shown on the display screen 42 of WCD 16, or to cause host computer 16 to interact in some manner with test equipment 20.

Display screen 70 is any computer display, such a CRT or LCD display for instance, which may be coupled as an external peripheral or integrated component of a computer 24. Computer 24 preferably further includes a video driver (not shown) to facilitate presentation of images on display screen 70. In the exemplary embodiment, display screen 70 will present data communicated from host computer 18 via WAN 14, including but not limited to a screen image conveyed through a digital representation from WCD 16 to host computer 18 and in turn via WAN 14 to remote computer 24.

User-input mechanism 72 preferably comprises a keyboard and a mouse, through which user 26 can enter commands and data into remote computer 24. For instance, user 26 may use the keyboard or mouse to type commands or make menu selections, so as to cause remote computer 24 to send one or more control commands via WAN 14 to host computer 18, to thereby affect operation of WCD 16 and/or test equipment 20.

2. Communication Between Remote Computer and WCD

In accordance with the exemplary embodiment, the remote computer 24 and WCD 16 will exchange control communications and other data via WAN 14 and host computer 18. For example, at the request of user 26, remote computer 24 may send a control signal via WAN 14 to host computer 18 that causes host computer 18 to send a control signal to WCD 16, and that control signal to WCD 16 may cause WCD 16 to take a designated action, which may include reporting data in response. Further, at the request of host computer 18 and/or autonomously, WCD 16 may send data to host computer 18, which host computer 18 may send via WAN 14 to remote computer, for presentation of the data to user 26.

By way of example, at the request of user 26, remote computer 24 may send via WAN 14 to host computer 18 one or more control signals to cause WCD 16 to dial a telephone number. In response to those control signals, host computer 18 may then send one or more corresponding control signals to WCD 16 to cause WCD 16 to dial the telephone number.

Further, remote computer 24 may contemporaneously (e.g., interleaved with the dialing control signals) send via WAN 14 to host computer 18 one or more control signals to cause WCD 16 to provide a digital representation of its current display image. In response to those control signals, host computer 18 may then send one or more corresponding control signals to WCD 16 to cause WCD 16 to provide a digital representation of its current display image. And in response to those control signals, WCD 16 will return to host computer 18 a digital representation of its current display image. In turn, host computer 18 will then return that digital display representation via WAN 14 to remote computer 24, and remote computer 24 will present the display image on display screen to user 26. This functionality is illustrated in FIG. 1 by the same cross-hatched display image (more likely text and/or graphics) being shown on the display of WCD 16 and the display of remote computer 24.

As presently contemplated, host computer 18 will engage in control and data communication with WCD 16 by applying the "Universal Tool Suite" (UTS) software available from Spirent Communications of Rockville, Md. The Spirent UTS software defines generalized application programming interface (API) objects (Microsoft DCOM objects), that can interact through a WCD-specific dynamic link library (DLL) module to exchange data communications with a given WCD through the WCD's pin-out port.

A computer can be programmed with the UTS software and further with a testing program that calls the UTS API and, if appropriate, receives data in return, so as to facilitate control and testing of a WCD. For example, by calling defined functions of the UTS API, the testing program can cause the UTS software to send (via the WCD-specific DLL) control commands such as "Dial 9" (to cause the WCD to behave as though its "9" key is being depressed), "Release" (to cause the WCD to behave as though its depressed key is released), "Dial 1", "Release", "Dial 1", "Release", "Dial SEND", and "Release", so as to cause the WCD to initiate a call to the number "911". As another example, by calling a designated function of the UTS API, the testing program can cause the UTS software to send a control command to the WCD to cause the WCD to capture and return a digital representation of its current display image. Other functions may include, for instance, powering the WCD on or off, causing the WCD to tune to a desired frequency or channel, and directing the WCD to report its receive signal strength or other RF metrics. Still other examples are possible as well.

In accordance with the exemplary embodiment, host computer 18 will be programmed with the UTS software or an analogous set of logic for communicating with WCD 16, and host computer 18 will further be programmed with host-interface logic that will interface between (i) communications via the UTS software with WCD 16 and (ii) communications via WAN 14 with remote computer 24. Remote computer 24 may thus send a control command via WAN 14 to host computer 18, and the host-interface logic will translate the control command into a call to the UTS API, to affect operation of the WCD 16. Further, the host-interface logic may receive data (e.g., a screen image, RF reporting data, and/or other data) provided by WCD 16 via the UTS software and may send that data via WAN 14 to remote computer 24, for presentation to user 26 in remote environment 12.

Preferably, the communication between remote computer 24 and host computer 24 will be IP-based. That is, both remote computer 24 and host computer 24 will have an IP address on WAN 14 or will otherwise be able to engage in packet-data communication via WAN 14. Control commands and return data can be conveyed over IP in any of a variety of ways. For instance, control commands can be provided as HTTP-based request messages, and return data could be provided in HTTP-based response messages. In a preferred embodiment, as presently contemplated, remote computer 24 and host computer 24 will employ Microsoft Web Services to communicate with each other. In particular, remote computer 24 will send control commands as XML-based commands over WAN 14 to host computer 18, and host computer will return data in binary form over WAN 14 to remote computer 14.

Figure 5:
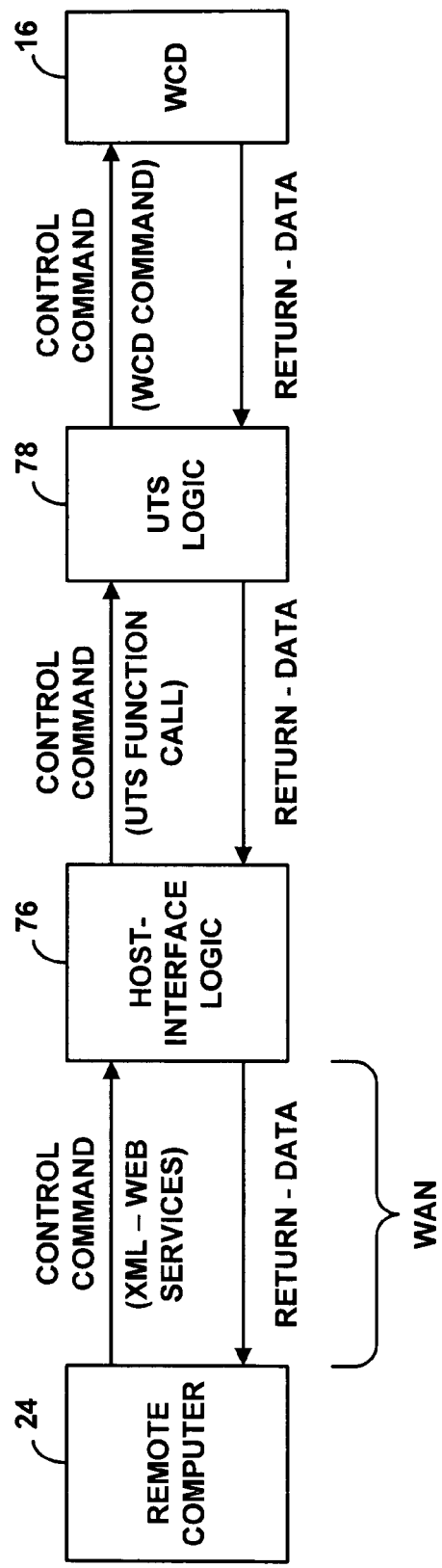
FIG. 5 is a message flow diagram depicting control and data communication between the remote computer and the WCD.

FIG. 5 depicts the resulting end-to-end communication arrangement between remote computer 24 and WCD 16. As shown, remote computer 24 communicates via WAN 14 with host-interface logic 76 on host computer 18. Host-interface logic 76 in turn communicates with UTS logic 78 on host computer 18. And UTS logic 78 then communicates with WCD 16. (More particularly, communications by or with host-interface logic 76 or UTS logic 78 will preferably be communications by or with processor 50 executing these instance of logic, such as through function calls, responses, and so forth.)

Thus, for instance, to cause WCD 16 to take a designated action, remote computer 24 may send a control command as an XML-based Microsoft Web Services message via WAN 14 to an IP address of host computer 18. Host-interface logic 76 may then receive that control command and responsively send a corresponding control command (e.g., the corresponding function call defined by the UTS API) to UTS logic 78. In turn, UTS logic 78 may then invoke the WCD-specific DLL (for WCD 16) to send a corresponding control command to WCD 16 so as to cause WCD 16 to take the designated action.

Similarly, WCD 16 may respond to a control command by returning data (such as a screen image, RF data, etc.) to host computer 18. UTS logic 78 may then receive that return-data and pass it back to host-interface logic 76. And in turn, host-interface logic 76 may then pass the return-data in a Microsoft Web Services message via WAN 14 to remote computer 24. Remote computer 24 may then present that data to user 26 and/or store or otherwise operate on the data.

Depending on the configuration of host-interface logic 76 and other components of the system, remote computer 24 may be able to send commands in bundled (macro) form to host computer 18, to trigger a series of actions by WCD 16. Alternatively, remote computer 24 may send individual commands to cause WCD 16 to take individual actions. By way of example, remote computer 16 may send to host computer 18 via WAN 14 a "Dial 911" command, which may programmatically cause host-interface logic 76 to send the following commands in series via UTS logic 78 to WCD 16:

1. Dial 9
2. Release
3. Get display
4. Dial 1
5. Release
6. Get display
7. Dial 1
8. Release
9. Get display
10. Dial SEND
11. Release
12. Get display
13. Get display
14. Get display
15. Get display (etc., periodically)

As a result, WCD 16 would place a call to the number "911" and, during the process, would return to host computer 18 and in turn via WAN 14 to remote computer 24 a series of display screen images, representing the images shown on the display screen 42 of WCD 16 as it places the call. Alternatively, remote computer 16 may send each of these commands in series to host computer 18, so as to achieve largely the same effect.

As another example, remote computer 24 may request WCD 16 to report its received signal strength (RSSI) and/or other RF metrics. For instance, remote computer 24 may send to host computer a "Report RSSI" command, which may programmatically cause host-interface logic 76 to send a corresponding command via UTS logic 78 to WCD 16, and WCD 16 may responsively return an indication of its received signal strength, which remote computer 24 may present to user 26.

Still further, in accordance with the exemplary embodiment, remote computer 24 may send a command to host computer 18 that puts host-interface logic 76 in a screen-image monitoring mode. In the screen-image monitoring mode, host-interface logic 76 may automatically capture periodic screen images from WCD 16, such as by periodically sending a Get Display command via UTS logic 78 to WCD 16 and receiving digital screen image representations in response, and host-interface logic 76 would return those screen image representations via WAN 14 to remote computer 24. In this way, remote computer 24 can present user 26 with a fairly continuous sequence of screen images, so the user can see in substantially real time what the display screen of WCD 16 is showing. Remote computer 24 may then send a command to host computer 18 to switch off the screen-image monitoring mode.

Similarly, remote computer 24 may send a command to host computer 18 to put host-interface logic 76 in an RF-monitoring mode. In the RF-monitoring mode, host-interface logic 76 may automatically send periodic requests to WCD 16 for RF data such as received signal strength. As WCD 16 provides that data, host-interface logic 76 may then pass the data via WAN 14 to remote computer, so that host computer can present to user 26 a substantially real-time representation of the WCD's received signal strength.

Yet further, remote computer 24 may direct host computer 18 to enter various other automated test modes, such as a mode in which host-interface logic 76 power cycles WCD 16, a mode in which host-interface logic 76 tunes WCD 16 through a series of frequencies or channels, or the like.

3. Communication Between Remote Computer and Test Equipment

In addition to engaging in communication with WCD 16, remote computer 24 may engage in communication with test equipment 20, so as to control the test equipment and/or receive test data from the test equipment. This process can work in largely the same way that the above communication between the remote computer 24 and WCD 16 works. That is, host computer 18 can be equipped with program logic that interfaces with one or more components of test equipment 20. Host-interface logic 76 may perform this function or may itself interface with the program logic (akin to UTS logic 78) that performs this function.

Figure 6:
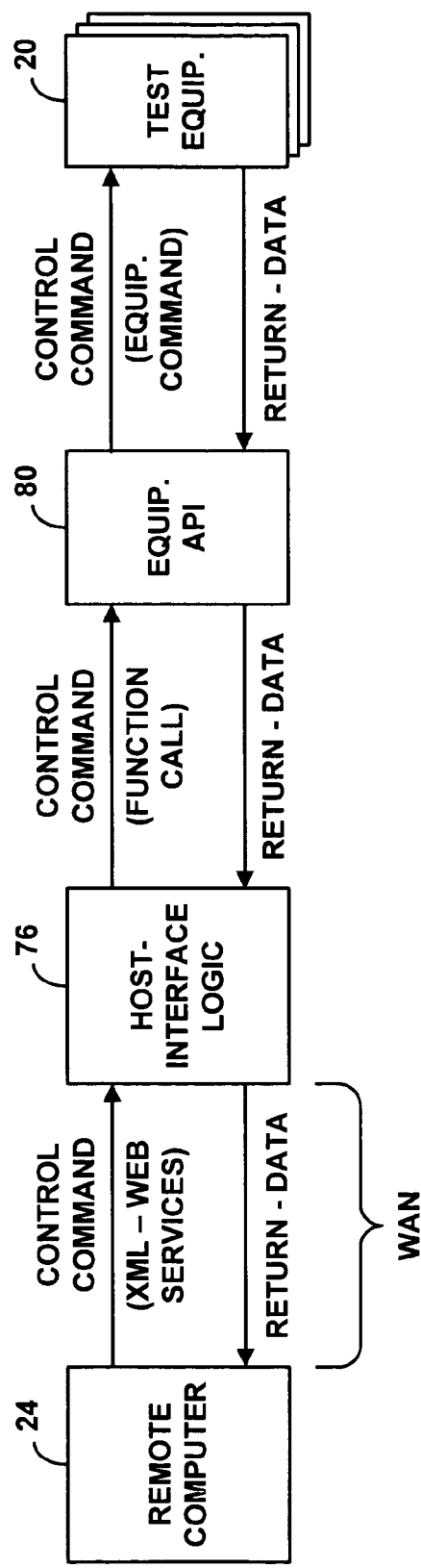
FIG. 6 is a message flow diagram depicting control and data communication between the remote computer and the test equipment shown in FIG. 1.

FIG. 6 illustrates an example of this communication arrangement. As shown, remote computer 24 communicates via WAN 14 with host-interface logic 76 on host computer 18. Host-interface logic 76 then communicates with a set of Equipment API logic 80 that in turn communicates with one or more components of test equipment 20. Thus, by way of example, remote computer 24 may send an XML-based control command via WAN 14 to host computer 18. Host-interface logic 76 may then make a corresponding function call to equipment-API logic 80, and equipment-API logic may in turn send a corresponding command to test equipment 20. Autonomously or in response to such a command, test equipment 20 may further send data (such as test results, or feedback on current settings) to host computer 18, which equipment-API 80 may pass to host-interface logic 76, and host-interface logic 76 may then send that data via WAN 14 to remote computer 24. Remote computer 24 may then display or other operate on the data.

By instructing remote computer 24 as desired, user 26 in remote environment 12 can thereby control test equipment 20 and receive data from the test equipment 20. For instance, the user 26 can cause test equipment 20 to power on or off, to impose certain test conditions on WCD 16, and/or to report how WCD 16 responds to certain tests. Further, while controlling test equipment (e.g., directing administration of various tests on WCD 16), remote computer 18 can be controlling WCD 16 as described above and can be receiving and presenting substantially real-time updates of the screen image that is displayed on WCD 16. Thus, user 26 can in effect fully control and monitor testing of WCD 16, notwithstanding the fact user 26 is located in remote environment 12 potentially a great distance from WCD 16.

4. Audio Communication Between Remote Computer and WCD

According to a further aspect of the exemplary embodiment, remote computer 24 may engage in substantially real-time audio communication with WCD 16, so that user 26 can hear audio output by WCD 16 and can send audio (e.g., speech) into WCD 16. To accomplish this in the preferred embodiment, remote computer 24 and host computer 18 will engage in packet-based real-time media communication over WAN 14, such as communication according to the well known Realtime Transport Protocol (RTP). As host computer 18 will be coupled with the audio I/O interface 44 of WCD 16, audio can thus flow end-to-end between remote computer 24 and WCD 16.

Figure 7:
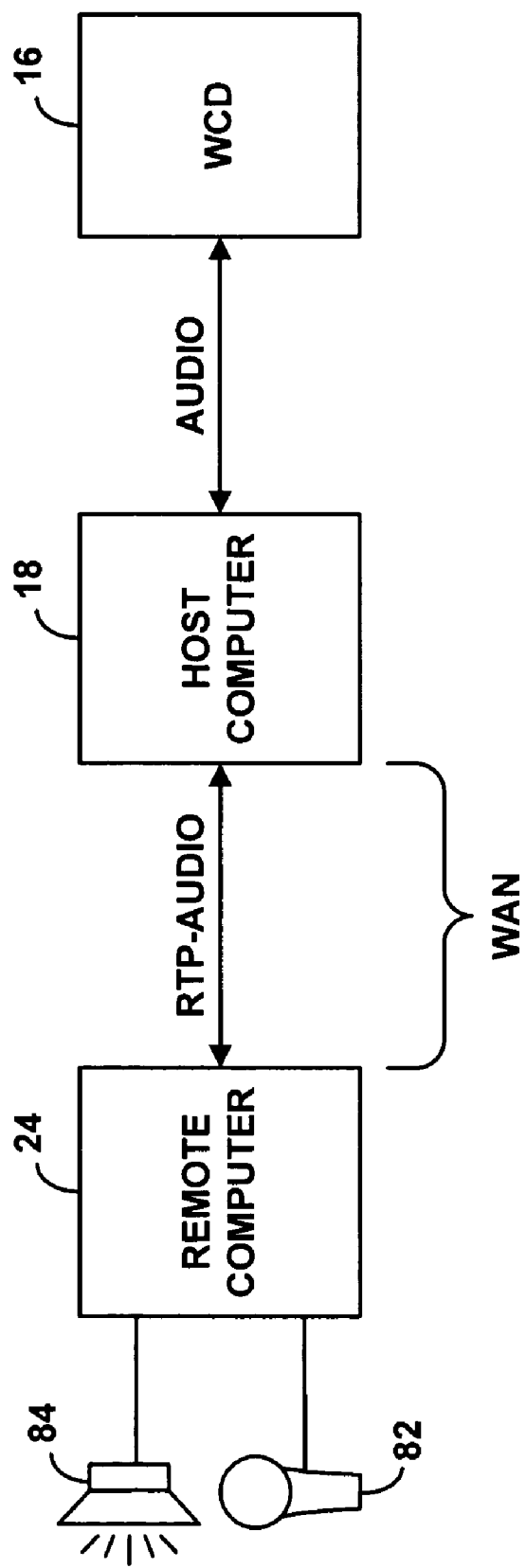
FIG. 7 is a diagram depicting end-to-end audio communication between the remote computer and the WCD.

This arrangement is shown in FIG. 7, which depicts audio flowing between WCD 16 and host computer 18, and RTP-based audio flowing over WAN 14 between host computer 18 and remote computer 24. Audio I/O interface 66 of remote computer 24 may then include a microphone 82 and speakers 84 to exchange audio with user 26.

To facilitate RTP communication between remote computer 24 and host computer 18, the computers can engage in setup signaling with each other, using a protocol such as the well known Session Initiation Protocol (SIP) for instance. Through an exchange of SIP messages, the computers can agree on the audio encoding format and other session parameters, and they may then send RTP audio packets to each other. (The RTP-audio can be sent separate from the Web-Services based control communications described above, or it may be included as binary data within the Web-Services messages.) For this purpose, each computer may be programmed with SIP client logic and RTP client logic, as well as one or more audio codecs (e.g., G.723.1), in a manner well known in the art, with which host-interface logic 76 may be arranged to interact.

Thus, in practice, host computer 18 may receive analog audio from WCD 16, digitize and encode it to produce an encoded audio bit stream, and send the bit stream in RTP/IP packets via WAN 14 to remote computer 24. Remote computer 24 may then reassemble the bit stream and decode and play out the underlying audio to user 26. Similarly, remote computer 24 may receive analog audio from user 26, digitize and encode it to produce an encoded bit stream, and send the bit stream in RTP/IP packets via WAN to host computer 18. Host computer 18 may then reassemble the bit stream and decode and play out the underlying audio to WCD 16.

With the benefit of this arrangement, user 26 in remote environment 12 can engage in audio communication with WCD 16 in test environment 10, while controlling and testing WCD 16 as described above. For instance, after directing WCD 16 to place an outgoing telephone call, user 26 can then engage in a conversation with the party who answers the call. In this way, user 26 can further test operation of WCD 16.

Preferably, by engaging in setup signaling to establish RTP communication with host computer 18, remote computer 24 (at the request of user 26 for instance) may thus put host-interface logic 76 into an audio communication mode, i.e., a mode in which host-interface logic 76 (or more generally host computer 18) receives audio from remote computer 24 and passes it along to WCD 16 and receives audio from WCD 16 and passes it along to remote computer 24. Further, by ending the RTP session (e.g., with a SIP BYE message), remote computer 24 can turn off the audio communication mode.

5. Initialization of Communication Between Remote Computer and Host Computer In order to begin communication between remote computer 24 and host computer 18, remote computer 24 may (e.g., upon user request) programmatically send to a known IP address or URL of host computer 18 an initialization command. By way of example, remote computer 24 may send via WAN 14 to host computer 18 a Web-Services based "Connect" message, preferably including with the request one or more pieces of identifying information, such as a username and password, and an identification of the WCD to be tested. Further, the remote computer 24 and host computer 18 may engage in SIP signaling to establish audio communication. Assuming the host computer 18 has been physically coupled with (or is otherwise in communication with) WCD 16 and, if applicable, test equipment 20, remote testing of WCD 16 may then begin.

6. Conclusion

An exemplary embodiment of the present invention has thus been described above. Those skilled in the art will understand, however, that changes and modifications may be made to this embodiment without departing from the true scope and spirit of the present invention, which is defined by the claims.

What is claimed is:

1. A method comprising:

providing a communication link between a host computer and a wireless communication device (WCD) in a test environment;

receiving one or more control commands into the host computer via a packet-switched network from a remote computer, and responsively sending one or more corresponding control commands via the communication link from the host computer to the WCD to cause the WCD to take one or more actions, wherein the one or more actions comprises reporting one or more diagnostic monitoring metrics to the host computer;

receiving at the host computer, via the communication link from the WCD, the one or more diagnostic monitoring metrics and sending the one or more diagnostic monitoring metrics via the packet-switched network to the remote computer, for presentation of the diagnostic monitoring metrics at the remote computer; and receiving at the host computer, via the communication link from the WCD, a digital representation of a WCD display screen image, and sending the digital representation over the packet-switched from the host computer to the remote computer, for display of the WCD screen image at the remote computer.

2. The method of claim 1, wherein the one or more actions comprises dialing one or more digits.

3. The method of claim 1, wherein the one or more actions comprises returning the WCD display screen image to the host computer.

4. The method of claim 1, further comprising:

in response to the one or more control commands from the remote computer, switching the host computer into a screen-image monitoring mode.

5. The method of claim 1, wherein the one or more control commands from the remote computer to the host computer comprises a macro command that causes the host computer to perform a plurality of functions.

6. The method of claim 1, further comprising:

providing an audio communication link between the host computer and the WCD;

receiving outbound audio at the host computer via the audio communication link from the WCD, and sending the outbound audio via the packet-switched network to the remote computer, for presentation of the outbound audio at the remote computer; and receiving inbound audio at the host computer via the packet-switched network from the remote computer, and sending the inbound audio via the audio communication link to the WCD.

7. A method comprising:

providing a first communication link between a host computer and a wireless communication device (WCD) in a test environment;

receiving a first control command into the host computer via a packet-switched network from a remote computer, and responsively sending a corresponding first control command via the communication link from the host computer to the WCD to cause the WCD to take a first action;

receiving at the host computer, via the communication link from the WCD, a digital representation of a WCD display screen image, and sending the digital representation over the packet-switched from the host computer to the remote computer, for display of the WCD screen image at the remote computer;

providing a second communication link between the host computer and at least one component of test equipment in the test environment; and receiving a second control command into the host computer via the packet-switched network from the remote computer, and responsively sending a corresponding second control command via the second communication link from the host computer to the at least one component of test equipment to cause the test equipment to take a second action.

8. The method of claim 7, wherein the second action comprises changing a test setting.

9. The method of claim 7, wherein the second action comprises imposing a test condition on the WCD.

10. The method of claim 7, wherein the second action comprises returning one or more test results to the host computer, the method further comprising sending the one or more test results from the host computer via the packet-switched network to the remote computer, for presentation of the one or more test results at the remote computer.

11. The method of claim 7, further comprising:

providing an audio communication link between the host computer and the WCD;

receiving outbound audio at the host computer via the audio communication link from the WCD, and sending the outbound audio via the packet-switched network to the remote computer, for presentation of the outbound audio at the remote computer; and receiving inbound audio at the host computer via the packet-switched network from the remote computer, and sending the inbound audio via the audio communication link to the WCD.

12. A system comprising:

a first computer coupled through at least one cable connection with a wireless communication device and communicatively linked with a wide area packet-switched network; and a second computer communicatively linked with the wide area packet-switched network, wherein the first computer receives in substantially real-time via the cable connection from the wireless communication device a representation of a screen image being displayed on the wireless communication device, and wherein the first computer sends the screen image representation in substantially real-time over the wide area packet-switched network to the second computer, wherein the second computer receives the screen image representation from the first computer via the wide area packet-switched network and displays the screen image on a computer display in substantially-real time for viewing by a person, wherein the second computer receives control input from the person and sends a corresponding control signal over the wide area packet-switched network to the first computer, and wherein the first computer provides the control signal via the cable connection to the wireless communication device, whereby the person at the second computer thereby controls operation of the wireless communication device, via the wide area packet-switched network, while viewing on the computer display in substantially real-time the screen image being presented on the wireless communication device.

13. The system of claim 12, wherein the wireless communication device comprises a cellular telephone.

14. The system of claim 12, wherein the first computer and second computer are located on different continents.

15. The system of claim 12,
wherein the first computer further receives wireless communication metrics from the wireless communication device and sends the wireless communication metrics in substantially real-time over the wide area packet-switched network to the second computer, and
wherein the second computer further receives the wireless communication metrics and presents the wireless communication metrics to the person.

16. The system of claim 12,
wherein the wireless communication device is situated in a test environment,
wherein the second computer further receives test-environment control directives from the person and sends the test-environment control directives in substantially real-time over the wide area packet-switched network to the first computer, and
wherein the first computer outputs the test-environment control directives to modify aspects of the test environment.

17. The system of claim 12,
wherein the first computer receives in substantially real-time via the cable connection from the wireless communication device a representation of sound output from the wireless communication device, and wherein the first computer sends the sound representation in substantially real-time over the wide area packet-switched network to the second computer, and
wherein the second computer receives the sound representation from the first computer via the wide area packet-switched network and outputs the sound for hearing by the person.

18. The system of claim 12,
wherein the person inputs sound to the second computer, and the second computer sends a representation of the sound via the wide area packet-switched network to the first computer, and
wherein the first computer receives the sound representation from the second computer via the wide area packet-switched network and provides the sound representation via the cable connection to the wireless communication device.

19. A method comprising:
providing a communication link between a host computer and a wireless communication device (WCD) in a test environment;
receiving one or more control commands into the host computer via a packet-switched network from a remote computer, and responsively sending one or more corresponding control commands via the communication link from the host computer to the WCD to cause the WCD to take one or more actions, wherein the one or more actions comprises reporting one or more radio frequency (RF) metrics to the host computer;
receiving at the host computer, via the communication link from the WCD, the one or more RF metrics and sending the one or more RF metrics via the packet-switched network to the remote computer, for presentation of the RF metrics at the remote computer; and
receiving at the host computer, via the communication link from the WCD, a digital representation of a WCD display screen image, and sending the digital representation over the packet-switched from the host computer to the remote computer, for display of the WCD screen image at the remote computer.

20. A method comprising:
providing a communication link between a host computer and a wireless communication device (WCD) in a test environment;
receiving one or more control commands into the host computer via a packet-switched network from a remote computer, and responsively sending one or more corresponding control commands via the communication link from the host computer to the WCD to cause the WCD to take one or more actions;
in response to at least one control command from the remote computer, switching the host computer into a radio frequency (RF)-monitoring mode; and
receiving at the host computer, via the communication link from the WCD, a digital representation of a WCD display screen image, and sending the digital representation over the packet-switched from the host computer to the remote computer, for display of the WCD screen image at the remote computer.

21. A method comprising:
providing a communication link between a host computer and a wireless communication device (WCD) in a test environment;
receiving one or more control commands into the host computer via a packet-switched network from a remote computer, and responsively sending one or more corresponding control commands via the communication link from the host computer to the WCD to cause the WCD to take one or more actions;
in response to at least one control command from the remote computer, switching the host computer into an audio communication mode in which the host computer passes audio between the remote computer and the WCD; and
receiving at the host computer, via the communication link from the WCD, a digital representation of a WCD display screen image, and sending the digital representation over the packet-switched from the host computer to the remote computer, for display of the WCD screen image at the remote computer.

22. The method of claim 21, further comprising:
in response to the one or more control commands from the remote computer, switching the host computer into a screen-image monitoring mode.

* * * * *